(12) United States Patent
Steury et al.

(10) Patent No.: US 6,206,456 B1
(45) Date of Patent: Mar. 27, 2001

(54) CAMPING TRAILER LIFT

(76) Inventors: Virgil H. Steury, 213 Egbert Rd.;
Edwin J. Steury, 58095 Cobblestone Rd., both of Goshen, IN (US) 46526

( * ) Notice: Subject to any disclaimer, the term of this patent is extended or adjusted under 35 U.S.C. 154(b) by 0 days.

(21) Appl. No.: 09/379,026

(22) Filed: Aug. 23, 1999

Related U.S. Application Data

(63) Continuation-in-part of application No. 08/988,308, filed on Dec. 10, 1997, now abandoned.

(51) Int. Cl.[7] .................................................. B60P 3/355
(52) U.S. Cl. ......................... 296/173; 296/26.05; 254/45
(58) Field of Search .............................. 296/26.02, 26.05, 296/165, 173; 52/632, 645; 403/363; 254/45, 47, 387

(56) References Cited

U.S. PATENT DOCUMENTS

| | | | |
|---|---|---|---|
| 2,853,338 | * 9/1958 | Stanley | 296/173 |
| 3,314,715 | 4/1967 | Bontrager | 296/173 |
| 3,495,866 | 2/1970 | Bontrager . | |
| 3,507,535 | 4/1970 | Wallace | 296/26.05 |
| 3,508,782 | 4/1970 | Hostetler et al. . | |
| 3,674,305 | 7/1972 | Steury . | |
| 3,749,439 | 7/1973 | Ferguson . | |
| 3,885,826 | 5/1975 | Kropf | 296/26.05 |
| 3,981,529 | 9/1976 | Bontrager . | |
| 4,171,843 | 10/1979 | Steury . | |
| 4,328,989 | 5/1982 | Childers | 296/26.05 |

FOREIGN PATENT DOCUMENTS

| | | | |
|---|---|---|---|
| 795216A | 9/1968 | (CA) | 296/173 |
| 2524402 | 12/1975 | (DE) | 52/632 |
| 2500738 | 7/1976 | (DE) | 296/26.05 |

* cited by examiner

*Primary Examiner*—Dennis H. Pedder
(74) *Attorney, Agent, or Firm*—Trexler, Bushnell, Giangiorgi, Blackstone & Marr, Ltd.

(57) ABSTRACT

A lift for a travel trailer top is disclosed which includes novel corner posts or jacks each of which comprises a plurality of telescoping channel members for strength and rigidity and formed with integral marginal portions for receiving actuator push-pull elements.

19 Claims, 4 Drawing Sheets

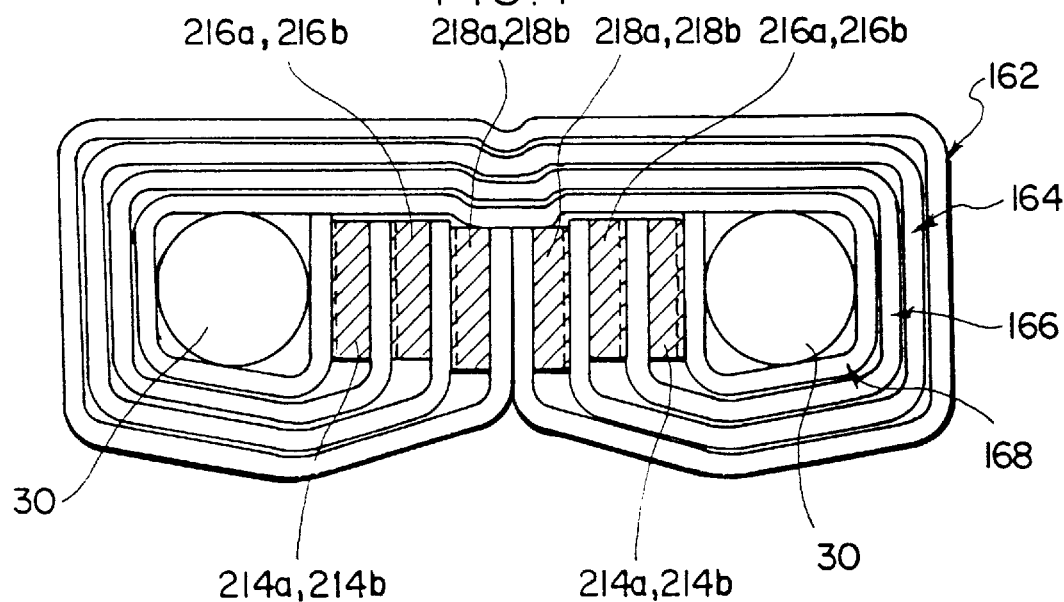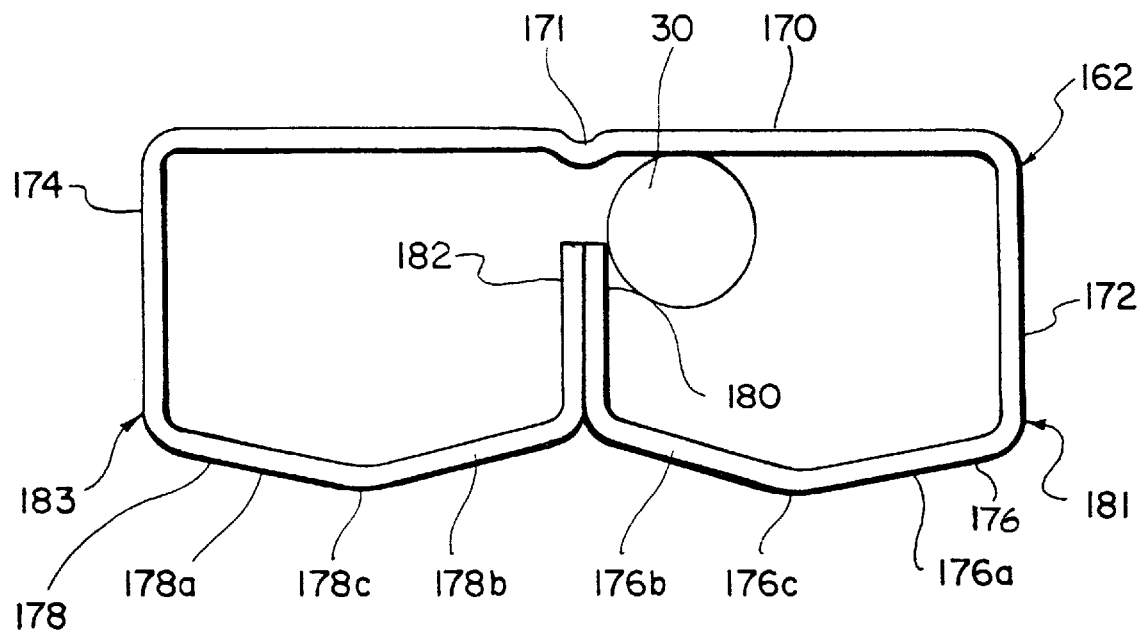

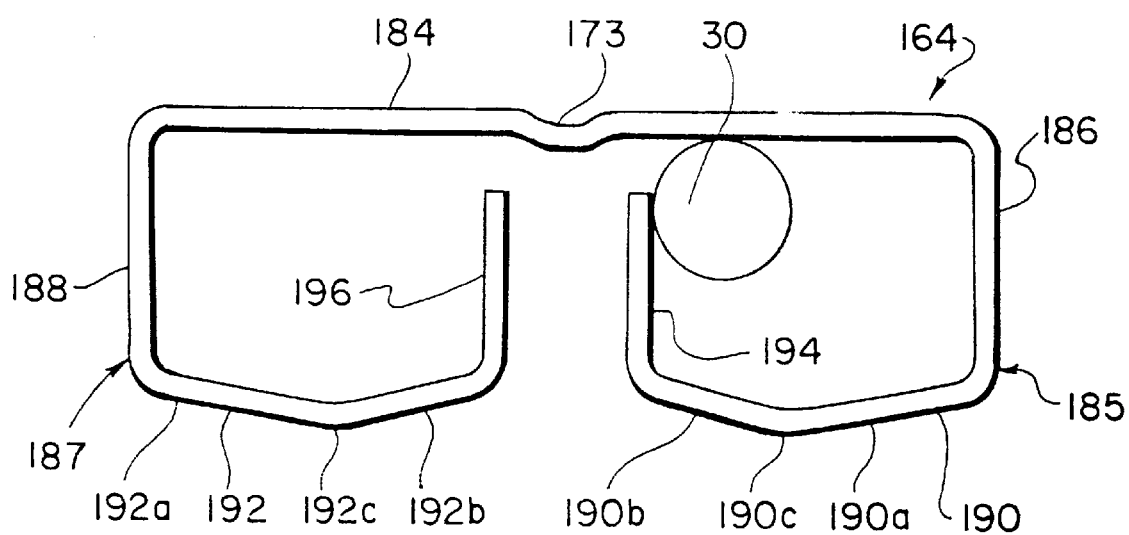
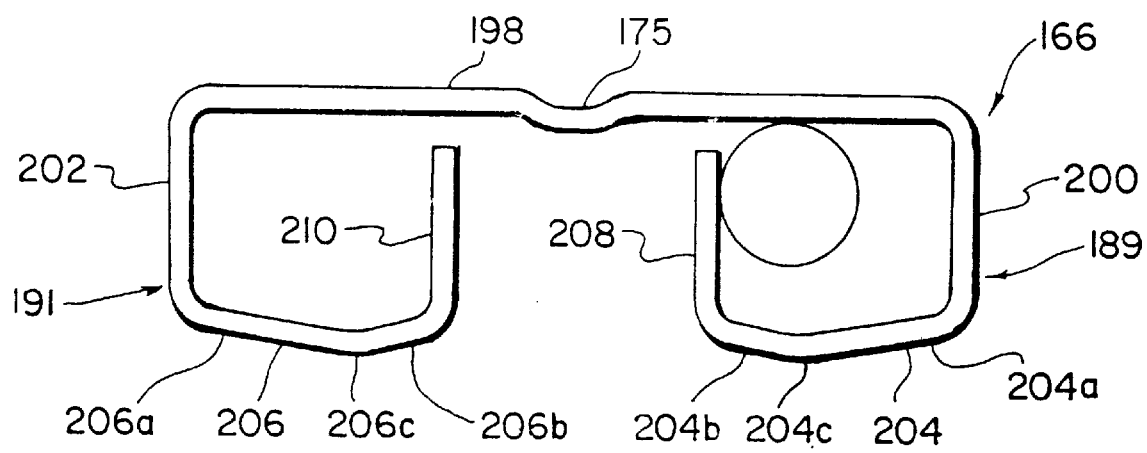
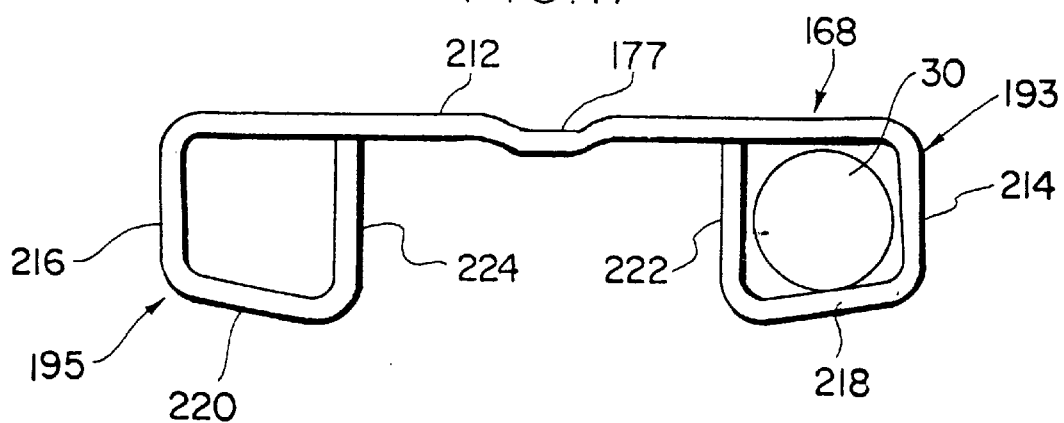

CAMPING TRAILER LIFT

The present application is a continuation-in-part of Ser. No. 08/988,308, filed Dec. 10, 1997, now abandoned, and entitled "Camping Trailer Lift".

The present invention relates to a novel lift for camping trailers of the type having collapsible tops adapted to be raised during use and lowered for travel or storage.

BACKGROUND OF THE INVENTION

Camping trailers have long been provided with various lift mechanisms for raising and lowering the top. Certain of such mechanisms are disclosed in the present Applicants' prior U.S. patent applications Ser. No. 08/609780 filed Mar. 1, 1996, now U.S. Pat. No. 5,704,677, for Drive Assembly For Retractable Tops Of A Mobile Housing and Ser. No. 08/940,139 filed Sep. 29, 1997, now U.S. Pat. No. 5,951,096 for Trailer Top Lift. These prior lifts utilize flexible push-pull rods or elements for actuating telescoping corner posts or jacks which support the trailer top. The flexible elements have usually been in the form of tightly coiled springs which slidably extend through guide conduits from a central actuating mechanism to the telescopic jacks located at the four corners of the trailer body. It is desirable for the guide conduits to fit the push-pull flexible rods or springs closely so as to prevent them from buckling and assuring proper uniform lifting of the top. In the prior lift mechanisms, the guide conduits terminate at the lower ends of the corner jacks which comprise a series of telescoping sections of progressively decreasing diameter from the bottom section to the top or uppermost section. The upper section has an inner diameter which closely fits the push-pull spring which, by way of example, may be about ½ inch in diameter. The remaining two or three lower sections progressively increase in diameter, but have been kept as small as possible so as to minimize buckling of the spring when the top is raised. While such prior lifts have enjoyed considerable success, it has been found that the smallness of the diameters of the sections sometimes does not provide adequate mechanical support and resistance to side sway to assure proper operation of such things as the side door of the trailer.

SUMMARY AND OBJECTS OF THE INVENTION

It is an object of the present invention to provide a novel trailer top lift structure which utilizes simple and efficient push-pull elements for actuating corner telescopic jacks and wherein the jacks are constructed so as to prevent or minimize buckling of the push-pull elements and at the same time provide improved mechanical support for the top and greater resistance to side sway.

In carrying out the present invention, it is contemplated that the lift may include a plurality of flexible push rods, guide conduits and an actuator mechanism similar to those disclosed in the above identified pending applications, the disclosures of which are incorporated herein by reference. The lift includes novel corner posts or jacks, each of which comprises a plurality of telescoping members having sufficient width and reverse bends to obtain the desired strength and rigidity and also including integral sections for snugly receiving and guiding the push-pull elements and preventing them from buckling.

Other objects and advantages of the present invention will become apparent from the following detailed description and the accompanying drawings.

BRIEF DESCRIPTION OF THE DRAWINGS

FIGS. 7–11 illustrate top elevational views of a second embodiment of a telescopic corner post or jack constructed in accordance with the present invention.

DETAILED DESCRIPTION OF A PREFERRED EMBODIMENT

Figure 1:
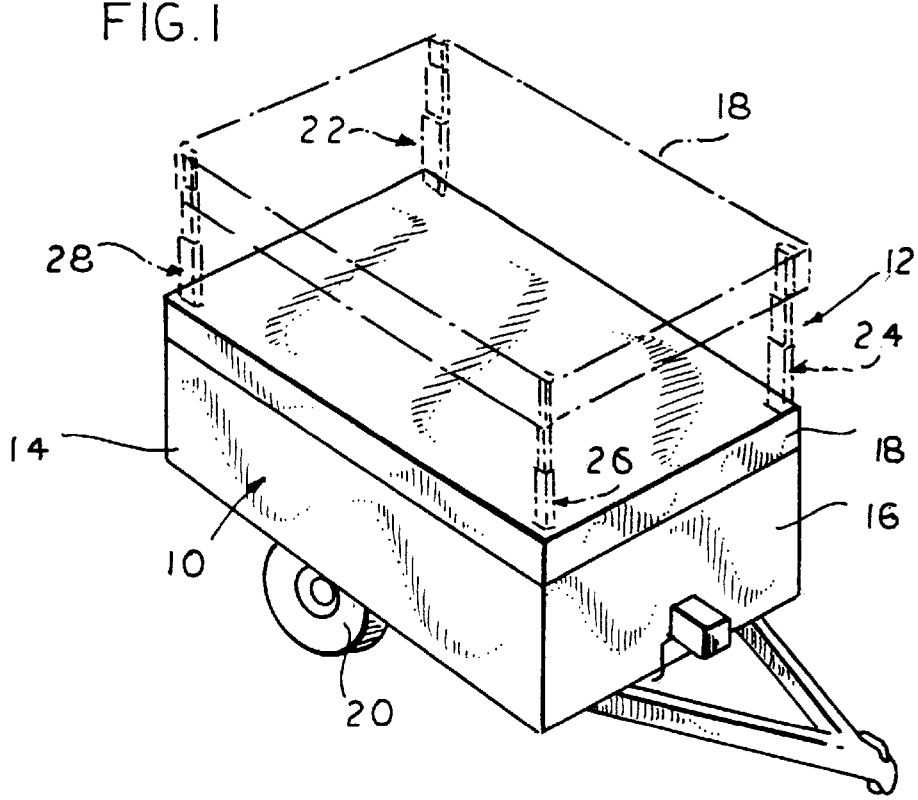
FIG. 1 is a perspective view of a camping trailer incorporating a lift of the present invention and showing the top in solid lines in a collapsed or lowered position and further showing the top in broken lines in a raised position.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Referring now more specifically to the drawings wherein like parts are designated by the same numerals throughout the various Figures, a camping trailer 10 incorporating a lift mechanism 12 embodying the present invention is shown in FIG. 1. The trailer 10 comprises a rectangular body 14 having side walls 16 and a top 18 adapted to be raised from a lowered position shown in solid lines in FIG. 1 to a raised position shown in broken lines in FIG. 1. The body 14 and top 18 may be of any well known construction and are supported for transport on wheels 20.

Figure 2:
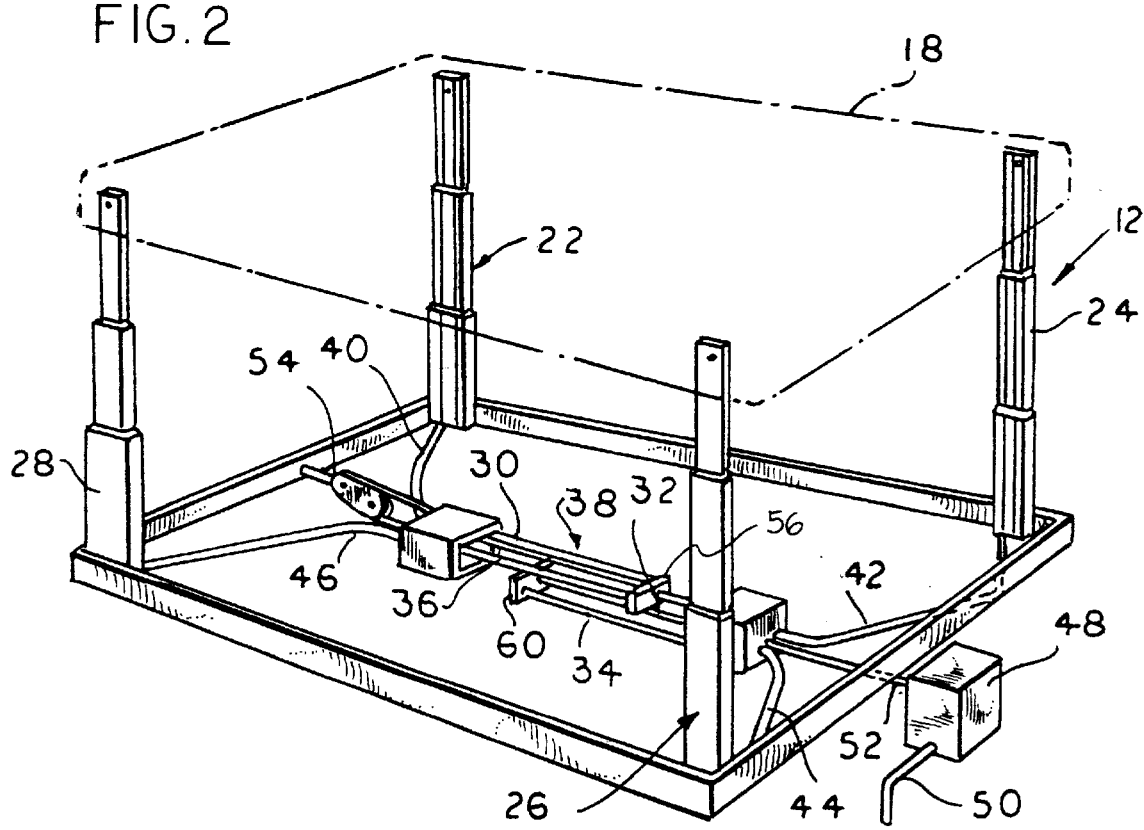
FIG. 2 is a simplified perspective view of a lift mechanism incorporating features of the present invention.

The lift 12 comprises four telescopic corner posts or jacks 22, 24, 26, 28 mounted at the corners of the body 14 and connected to the top 18. As shown in FIG. 2, flexible push-pull elements or push-pull rods 30, 32, 34, 36 extend from a centrally mounted actuator 38 to the jacks 22, 24, 26, 28, respectively, for operating the jacks 22, 24, 26, 28 in the manner described below. The push-pull rods 30, 32, 34, 36 are preferably in the form of tightly coiled springs and are directed to the jacks 22, 24, 26, 28 through guide conduits 40, 42, 44, 46, respectively. The guide conduits 40, 42, 44, 46 slidably and closely confine the push-pull rods 30, 32, 34, 36 so as to keep them from buckling during lifting of the top 18.

The actuator 38 includes a winch 48 having an operating handle 50 adapted to be manually turned by an operator. A cable 52 extends from the winch 48 through the trailer body 14 and around a pulley 54 for connection to the push-pull rods 30, 32, 34, 36. A first cross member 56 connects an upper or reverse run of the cable 50 with the push-pull rods 30 and 36 and a second cross member 60 connects a lower run of the cable 50 with the push-pull rods 32 and 34. For a more detailed disclosure of the actuator 38 and its operation, reference is made to the above-identified co-pending applications which disclosure has been herein incorporated by reference.

In accordance with the present invention, the jacks 22, 24, 26, 28 are identical to each other. A first embodiment of the jacks 22, 24, 26, 28 is shown in FIGS. 3–6. A second embodiment of the jacks, shown as jack 122, is shown in FIGS. 7–11.

Attention is invited to the first embodiment shown in FIGS. 3–6 which illustrates jack 22 with the understanding that jacks 24, 26, 28 are identical in construction. As shown, the jack 22 has three telescoping members 62, 64, 66. The lower member 62 extends upwardly from the floor 68 of the trailer 10 and may be secured in position by a bracket 69 fastened to a wall 16 of the body 14 with suitable fasteners, not shown.

The lower member 62 has a central wall section 70 terminating in opposite marginal sections 72, 74 to provide an initial C-shape or channel configuration. The marginal sections 72, 74 respectively join with reverse sections 76, 78 which, in turn, merge with respective return sections 80, 82. Marginal section 72, reverse section 76 and return section 80 combine to provide the channel with a first integral marginal portion 81 having a generally square cross-section along one vertical margin, and marginal section 74, reverse section 78 and return section 82 combine to provide the channel with a second integral marginal portion 83 having generally square cross-section along the opposite vertical margin. This construction greatly enhances the strength and rigidity of the jack 22.

Figure 5:
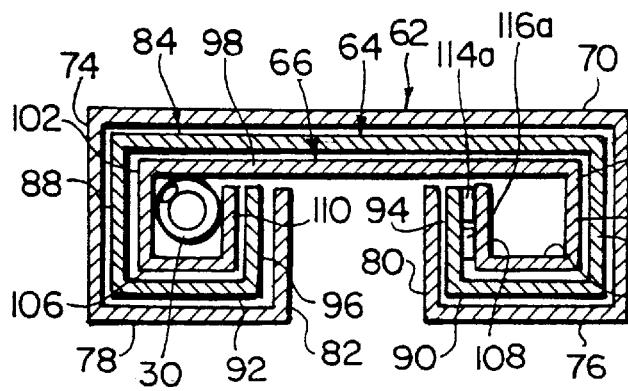
FIG. 5 is an enlarged sectional view taken along line 5—5 in FIG. 3.

As shown best in FIG. 5, the intermediate member 64 and the upper member 66 are identical to the lower member 62 except they are of progressively decreasing dimensions so that the members 62, 64, 66 may slidably telescope together. Thus, the intermediate member 64 has a central wall section 84 and opposite marginal integral portions 85 and 87 defined by sections 86, 88, 90, 92, 94, 96 corresponding to the sections 72, 74, 76, 78, 80, 82, respectively. Similarly, the upper member 66 has a central wall section 98 and opposite marginal integral portions 97 and 99 defined by sections 100, 102, 104, 106, 108 and 110 which correspond to sections 86, 88, 90, 92, 94 and 96, respectively, of the intermediate member 64.

Figure 3:
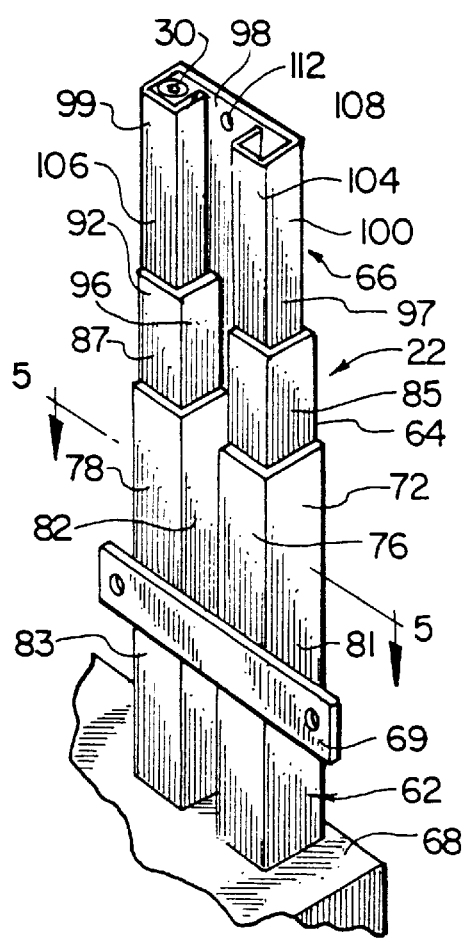
FIG. 3 is an enlarged perspective view of a first embodiment of a telescopic corner post or jack constructed in accordance with the present invention.
Figure 4:
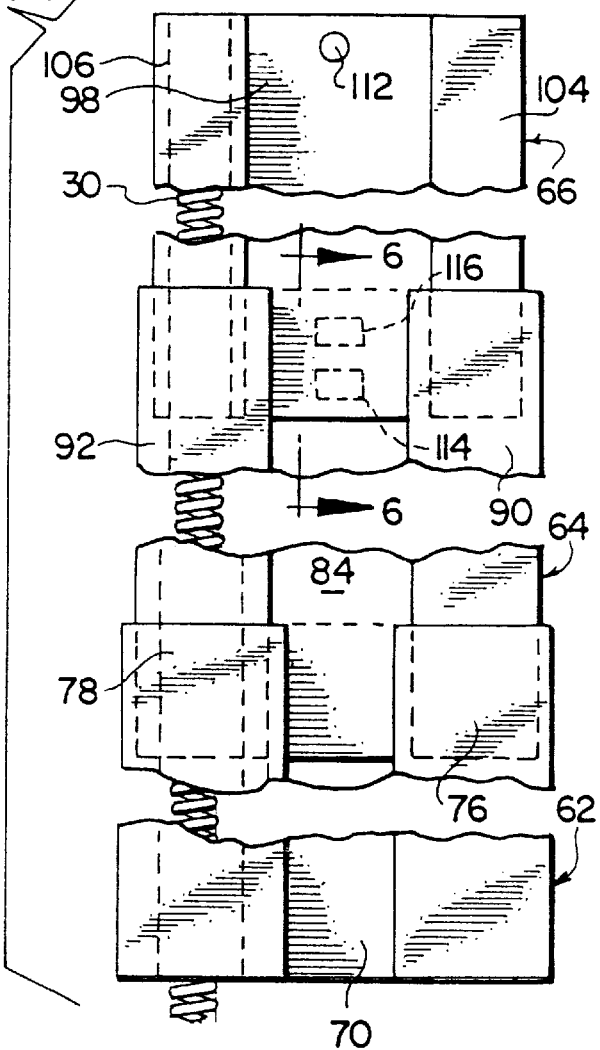
FIG. 4 is a further enlarged side elevational view, partially broken away, of the corner post or jack shown in FIG. 3.

As shown in FIGS. 3–5, the push-pull rod 30 extends upwardly through marginal portions 83, 87, 99 of the jack 22 until it pushes against a stop on the upper member 66 or against the under side of the top 18. The upper member 66 is secured to the top 18 by suitable fastening means, such as a screw or bolt, not shown, extending through a hole 112 formed in the central wall section 98. The marginal portion 99 formed by the sections 102, 106, 110 of the upper member 66 has internal dimensions for closely confining the push-pull rod 30. The corresponding marginal portions 87, 83 of the intermediate member 64 and the lower member 62 have slightly larger internal dimensions which are still sufficiently small for effectively confining the push-pull rod 30 to prevent undue buckling. While the dimensions may be varied, the push-pull rod 30 is commonly ½ inch in diameter and in such a case, the marginal portion 99 of the upper member 66 would be formed with internal dimensions of about ½ inch. Because the opposite marginal portions 97, 99 of the upper member 66 are identical in each jack 22, 24, 26, 28, the jacks 22, 24, 26, 28 may be used at all four corners of the trailer 10 and the push-pull rods 30, 32, 34, 36 may be selectively installed through either the marginal portions 83, 87, 99 or the marginal portions 81, 85, 97. This results because the jacks 22, 24, 26, 28 are symmetrical and there is no right or left orientation. The same distance from the actuator 38 is provided on each corner of the trailer body 14.

It is to be understood that the push-pull rod 30 is shown within marginal portions 83, 87, 99 for illustrative purposes only and could have instead been provided within marginal portions 81, 85, 97. It is also to be understood that a second set (not shown) of guide conduits and push-pull rods can be provided, like guide conduits 40, 42, 44, 46 and push-pull rods 30, 32, 34, 36, such that a first push-pull rod is provided within marginal portions 83, 87, 99 and a second push-pull rod is provided within marginal portion 81, 85, 97 at the same time in each jack 22, 24, 26, 28. Also, it is to be understood that more than three telescoping members 62, 64, 66 can be provided in the structure of each jack 22, 24, 26, 28.

Figure 6:
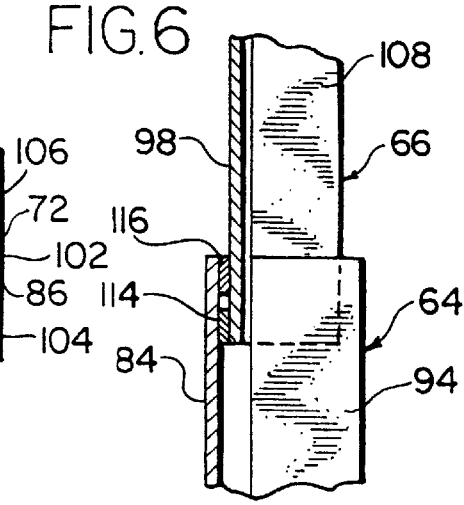
FIG. 6 is a fragmentary sectional view taken along line 6—6 in FIG. 4.

As indicated above, the lower member 62 is fixed with respect to the trailer body 14 and the upper member 66 is fixed with respect to and movable with the top 18. The intermediate member 64 is slidable with respect to both the upper and lower members 62, 66 when the jack 22 is in a collapsed or retracted condition. In order to raise the intermediate member 64 with the upper member 66, interengagable protuberances or abutments 114, 116 are fixed to or struck from the upper member 66 and the intermediate member 64, respectively. As shown in FIGS. 4 and 6, the protuberance or abutment 114 is located adjacent a lower margin of the central wall section 98 of the upper member 66 and the protuberance or abutment 116 is located near, but suitably spaced from the upper end of the central wall section 84 of the intermediate member 64. The arrangement is such that when the push-pull rod 30 is extended for raising the trailer top 18, the upper member 66 is first raised and then, upon engagement of the protuberance or abutment 114 with the protuberance or abutment 116, the intermediate member 64 is carried upwardly with the upper member 66 to the fully extended position. The protuberances or abutments 114, 116 are to be located so that there is no interference with the push-pull rod 30 and the internal dimensions of the marginal portions 97 and/or 99 can be kept at a minimum for confining the push-pull rod 30 and resisting buckling. The protuberances or abutments 114, 116 can be located as shown in FIGS. 4 and 6 or, preferably on the return sections 110, 96 as shown by the alternative protuberances or abutments 114a, 116a in FIG. 5. It is noted that the clearances between the marginal portions 99, 87, 83 and 97, 85, 81 are exaggerated in FIG. 5 for clarity of illustration. It is contemplated that there should be a close sliding fit between the marginal portions 99, 87, 83 and 97, 85, 81 so that the push-pull rod 30 located in one or both of these telescoping integral portions will be confined as closely as practical to minimize any possibility of buckling.

Attention is now invited to the second embodiment shown in FIGS. 7–11 which illustrates jack 122 with the understanding that the other jacks provided on the corners of the trailer 10 are identical in construction. As shown, the jack 122 has four telescoping members 162, 164, 166, 168. The lower member 162 extends upwardly from the floor 68 of the trailer 10 and may be secured in position by a bracket fastened to a wall 16 of the body 14 with suitable fasteners.

As best shown in FIG. 8, the lower member 162 has a central wall section 170 terminating in opposite marginal sections 172, 174 to provide an initial C-shape or channel configuration. The marginal sections 172, 174 respectively join with reverse sections 176, 178 which, in turn, merge with respective return sections 180, 182. Reverse section 176 is formed from a first portion 176a which slopes outwardly from marginal section 172 and away from the central wall section 170 and a second portion 176b which slopes outwardly from return section 180 and away from the central wall section 170 such that the first and second portions 176a, 176b join at an apex 176c. The first and second portions 176a, 176b are approximately the same length. Reverse section 178 is formed from a first portion 178a which slopes outwardly from marginal section 174 and away from the central wall section 170 and a second portion 178b which slopes outwardly from return section 182 and away from the central wall section 170 such that the first and second portions 178a, 178b join at an apex 178c. The first and second portions 178a, 178b are approximately the same length. The return sections 180, 182 abut against each other for greater strength to contain the push-pull rod 20 should it "S" to that side and the ends of the return sections 180, 182 are spaced apart from the central wall section 170 a predetermined distance which is less than the diameter of the push-pull rod 30. Marginal section 172, reverse section 176 and return section 180 combine to provide the channel with a first integral marginal portion 181 having a generally rectangular cross-section along one vertical margin, and marginal section 174, reverse section 178 and return section 182 combine to provide the channel with a second integral marginal portion 183 having generally rectangular cross-section along the opposite vertical margin.

A ridge 171 is provided in the center of the central wall section 170 and aligns with the ends of the return sections 180, 182. The ridge 171 provides a back block for the push-pull rod 30 if the push-pull rod 30 were to "S" its way to the opening between the ends of the return sections 180, 182 and the central wall section 170.

As shown best in FIG. 9, the first intermediate member 164 is similar in construction to the lower member 162 and it is of a decreased dimension to that of the lower member 162 so that members 162 and 164 can telescope together. Thus, the first intermediate member 164 has a central wall section 184 terminating in opposite marginal sections 186, 188 to provide an initial C-shape or channel configuration. The marginal sections 186, 188 respectively join with reverse sections 190, 192 which, in turn, merge with respective return sections 194, 196. Reverse section 190 is formed from a first portion 190a which slopes outwardly from marginal section 186 and away from the central wall section 184 and a second portion 190b which slopes outwardly from return section 194 and away from the central wall section 184 such that the first and second portions 190a, 190b join at an apex 190c. The first portion 190a is longer in length than the second portion 190b. Reverse section 192 is formed from a first portion 192a which slopes outwardly from marginal section 188 and away from the central wall section 184 and a second portion 192b which slopes outwardly from return section 196 and away from the central wall section 184 such that the first and second portions 192a, 192b join at an apex 192c. The first portion 192a is longer in length than the second portion 192b. The return sections 194, 196 are spaced apart from each other a predetermined distance and the ends of the return sections 194, 196 are spaced apart from the central wall section 184 a predetermined distance which is less than the diameter of the push-pull rod 30. Marginal section 186, reverse section 190 and return section 194 combine to provide the channel with a first integral portion 185 having a generally rectangular cross-section along one vertical margin, and marginal section 188, reverse section 192 and return section 196 combine to provide the channel with a second integral portion 187 having generally rectangular cross-section along the opposite vertical margin. A ridge 173 is provided in the center of the central wall section 184.

As shown best in FIG. 10, the second intermediate member 166 is similar in construction to the second intermediate member 164 and it is of a decreased dimension to that of the first intermediate member 164 so that members 164 and 166 can telescope together. Thus, the second intermediate member 166 has a central wall section 198 terminating in opposite marginal sections 200, 202 to provide an initial C-shape or channel configuration. The marginal sections 200, 202 respectively join with reverse sections 204, 206 which, in turn, merge with respective return sections 208, 210. Reverse section 204 is formed from a first portion 204a which slopes outwardly from marginal section 200 and away from the central wall section 198 and a second portion 204b which slopes outwardly from return section 208 and away from the central wall section 198 such that the first and second portions 204a, 204b join at an apex 204c. The first portion 204a is longer in length than the second portion 204b. Reverse section 206 is formed from a first portion 206a which slopes outwardly from marginal section 202 and away from the central wall section 198 and a second portion 206b which slopes outwardly from return section 210 and away from the central wall section 198 such that the first and second portions 206a, 206b join at an apex 206c. The first portion 206a is longer in length than the second portion 206b. The return sections 208, 210 are spaced apart from each other a predetermined distance and the ends of the return sections 208, 210 are spaced apart from the central wall section 198 a predetermined distance which is less than the diameter of the push-pull rod 30. Marginal section 200, reverse section 204 and return section 208 combine to provide the channel with a first integral portion 189 having a generally rectangular cross-section along one vertical margin, and marginal section 202, reverse section 206 and return section 210 combine to provide the channel with a second integral portion 191 having generally rectangular cross-section along the opposite vertical margin. A ridge 175 is provided in the center of the central wall section 198.

As shown best in FIG. 11, the upper member 168 is of a decreased dimension to that of the second intermediate member 166 so that members 166 and 168 can telescope together. The upper member 168 has a central wall section 212 terminating in opposite marginal sections 214, 216 to provide an initial C-shape or channel configuration. The marginal sections 214, 216 respectively join with reverse sections 218, 220 which, in turn, merge with respective return sections 222, 224. The return sections 222, 224 are spaced apart from each other a predetermined distance and the ends of the return sections 222, 224 abuts against the central wall section 212. Marginal section 214, reverse section 218 and return section 222 combine to provide the channel with a first integral portion 193 having a generally square cross-section along one vertical margin which has a dimension of approximately the same as the push-pull rod 30, and marginal section 216, reverse section 220 and return section 224 combine to provide the channel with a second integral portion 195 having generally square cross-section along the opposite vertical margin which has a dimension of approximately the same as the push-pull rod 30. A ridge 177 is provided in the center of the central wall section 212.

When the members 162, 164, 166, 168 are joined together as shown in FIG. 7, upper member 168 sits within and can slide with respect to second intermediate member 166; second intermediate member 166 sits within and can slide with respect to first intermediate member 164; and first intermediate member 164 sits within and can slide with respect to the lower member 164. The ridges 171, 173, 175, 177 increase in length, respectively, and align with each other.

A first push-pull rod 30 is provided within and extends upwardly through the marginal portions 181, 185, 189, 193 and a second push-pull rod can be provided within and extend upwardly through the marginal portions 183, 187, 191, 195 of the jack 122 until each push-pull rod pushes against a stop on the upper member 168 or against the under side of the top 18. The upper member 168 is secured to the top 18 by suitable fastening means, such as a screw or bolt, not shown, extending through a hole formed in the central wall section 212. The marginal portions 193, 195 have internal dimensions for closely confining the push-pull rod therein. The corresponding marginal portions 189, 191 of the second intermediate member 166, the corresponding marginal portions 185, 187 of the first intermediate portion 164, and the corresponding marginal portions 181, 183 of the lower member 162 have slightly larger internal dimensions which are still sufficiently small for effectively confining the push-pull rod 30 to prevent undue buckling. While the dimensions may be varied, the push-pull rod 30 is commonly ½ inch in diameter and in such a case, the marginal portions 193, 195 of the upper member 168 would be formed with internal dimensions of about ½ inch. Because the opposite marginal portions 193, 195 of the upper member 168 are identical in each corner jack, the jacks may be used at all four corners of the trailer 10 and the push-pull rods 30, 32, 34, 36 may be selectively installed through either the marginal portions 183, 187, 191, 195 or the marginal portions 181, 185, 189, 193. This results because the jacks are symmetrical and there is no right or left orientation. The same distance from the actuator 38 is provided on each corner of the trailer body 14.

It is to be understood that a second set (not shown) of guide conduits and push-pull rods can be provided, like guide conduits 40, 42, 44, 46 and push-pull rods 30, 32, 34, 36, such that a first push-pull rod can be provided within marginal portions 181, 185, 189, 193 and a second push-pull rod can be provided within and extend upwardly through the marginal portions 183, 187, 191, 195 97, 99 at the same time in each jack. Also, it is to be understood that more or less than four members 162, 164, 166, 168 can be provided in the structure of each jack.

As indicated above, the lower member 162 is fixed with respect to the trailer body 14 and the upper member 168 is fixed with respect to and movable with the top 18. The first and second intermediate members 164, 166 are slidable with respect to both the upper and lower members 162, 168 when the jack 22 is in a collapsed or retracted condition. In order to raise the second intermediate member 166 with the upper member 168, interengagable protuberances or abutments 214a, 214b are fixed to or struck from the upper member 168 and the second intermediate member 166, respectively. A protuberance or abutment 214a is located on each return section 222, 224 of the upper section 168 adjacent a lower margin thereof and a protuberance or abutment 214b is located on each return section 208, 210 of the second intermediate section 166 at a position which is located near, but suitably spaced from the upper end of the respective return section 208, 210. A protuberance or abutment 216a is located on each return section 208, 210 of the second intermediate section 166 adjacent a lower margin thereof and a protuberance or abutment 216b is located on each return section 194, 196 of the first intermediate section 164 at a position which is located near, but suitably spaced from the upper end of the respective return section 194, 196. Finally, a protuberance or abutment 218a is located on each return section 194, 196 of the first intermediate section 164 adjacent a lower margin thereof and a protuberance or abutment 218b is located on each return section 180, 182 of the lower section 164 at a position which is located near, but suitably spaced from the upper end of the respective return section 180, 182. The arrangement is such that when the push-pull rod 30 is extended for raising the trailer top 18, the upper member 168 is first raised and then, upon engagement of the protuberances 214a, 214b, the second intermediate member 166 is carried upwardly, and then upon engagement of the protuberances 216a, 216b, the first intermediate member 164 is carried upwardly to the fully extended position.

It is contemplated that there should be a close sliding fit between the marginal portions 183, 187, 191, 195 and 181, 185, 189, 193 so that the push-pull rod 30 located in one or both of these telescoping integral portions will be confined as closely as practical to minimize any possibility of buckling.

While preferred embodiments of the present invention have been shown and described herein, many structural modifications may be made without departing from the spirit and scope of the appended claims.

The invention is claimed as follows:

1. A lift for raising and lowering the top of a mobile trailer comprising: a plurality of telescopic jacks respectively adjacent corners of a trailer body and supporting a trailer top, an actuator mechanism mounted on the trailer body, and a plurality of flexible push-pull elements connected with and extending from said actuator mechanism to said jacks for actuating the jacks to raise the top, each of said jacks being comprised of a plurality of telescoping channel members having spaced apart opposite upstanding portions connected together, at least one of said opposite upstanding portions receiving an end of one of said flexible push-pull elements and substantially enclosing said end of said one flexible push-pull element therewithin and resisting buckling of said one flexible push-pull element.

2. A lift as defined in claim 1, wherein said channel members of each of said jacks include a lower channel member, an upper channel member and at least one intermediate channel member immediately below said upper channel member, said upper channel member and said one intermediate channel member including interengageable means for lifting said one intermediate member when said upper member is raised.

3. A lift as defined in claim 2, wherein said interengageable means is located on at least one of the opposite upstanding portions of the upper and intermediate channel members.

4. A lift as defined in claim 2, wherein each said at least one of said opposite upstanding portions which receives and substantially encloses said end of one of said flexible push-pull elements includes a wall, a flange extending outwardly from said wall, a reverse section connected to said flange being generally parallel to said wall, and a return section connected to said reverse section and being parallel to said flange.

5. A lift as defined in claim 4, wherein said interengageable means is located on said return sections of the upper and intermediate channel members.

6. A lift as defined in claim 2, wherein said opposite upstanding portions of said lower channel member are defined by a substantially rectangular cross-section, said opposite upstanding portions of said at least one intermediate channel member are defined by a substantially rectangular cross-section, and said opposite upstanding portions of said upper channel member are defined by a substantially square cross-section.

7. A lift as defined in claim 2, further including a ridge formed between said opposite upstanding portions of said lower channel member for preventing said push-pull element from being released therefrom.

8. A lift as defined in claim 1, further including a ridge formed between said opposite upstanding portions for preventing said push-pull element from being released from said at least one of said opposite upstanding portions which receives and substantially encloses said end of one of said flexible push-pull elements.

9. A lift as defined in claim 1, wherein each said opposite upstanding portion is defined by a generally square cross-section.

10. A lift as defined in claim 1, wherein each said flexible push-pull element is a spring having a one-half inch diameter.

11. A lift for raising and lowering a top of a mobile trailer comprising: a plurality of corner jacks adjacent corners of a trailer body, each of said jacks including a lower channel member, an upper channel member and at least one intermediate telescoping channel member, each said lower, upper and intermediate channel member including a central wall section and opposite spaced apart integral marginal portions attached to said central wall section; a plurality of flexible push-pull elements respectively extending into said channel members of each of said jacks, each said push-pull element being generally surrounded by a portion of said central wall sections and one of said marginal portions of each said channel member, and actuator means connected with said push-pull elements for extending and retracting the push-pull elements for raising and lowering a trailer top.

12. A lift as defined in claim 11, wherein said central wall and one of said marginal portions define a generally square cross-section, and said central wall and the other of said marginal portions define a generally square cross-section.

13. A lift as defined in claim 11, further including interengageable abutment means on said upper channel member and said intermediate channel members for raising said intermediate channel members when the-upper channel members are extended.

14. A lift as defined in claim 13, wherein said abutment means are located on said central wall sections of said channel members.

15. A lift as defined in claim 11, wherein each said marginal portion includes a flange extending outwardly from said central wall section, a reverse section connected to said flange being generally parallel to said central wall section, and a return section connected to said reverse section and being generally parallel to said flange.

16. A lift as defined in claim 15, wherein said interengageable means is located on said return section of the upper and intermediate channel members.

17. A lift as defined in claim 11, wherein said central wall and one of said marginal portions of said lower channel member is defined by a substantially rectangular cross-section and said central wall and the other of said marginal portions of said lower channel member is defined by a substantially rectangular cross-section, said central wall and one of said marginal portions of said at least one intermediate channel member is defined by a substantially rectangular cross-section and said central wall and the other of said marginal portions of said at least one intermediate channel member is defined by a substantially rectangular cross-section, and said central wall and one of said marginal portions of said upper channel member is defined by a substantially square cross-section and said central wall and the other of said marginal portions of said upper channel member is defined by a substantially square cross-section.

18. A lift as defined in claim 11, further including a ridge along said central wall section of said lower channel member.

19. A lift as defined in claim 11, wherein each said flexible push-pull element is a spring having a one-half inch diameter.

* * * * *